United States Patent [19]

Rose

[11] 3,901,334

[45] Aug. 26, 1975

[54] EGG WEIGHING APPARATUS

[75] Inventor: Boyd W. Rose, Riverside, Calif.

[73] Assignee: FMC Corporation, San Jose, Calif.

[22] Filed: July 5, 1974

[21] Appl. No.: 486,138

[52] U.S. Cl. ................................ 177/52; 209/121
[51] Int. Cl. ............................................ G01g 13/00
[58] Field of Search .......... 177/52, 56, 57, 122–123, 177/145; 209/121

[56] References Cited
UNITED STATES PATENTS

| | | | |
|---|---|---|---|
| 2,773,597 | 10/1956 | Gross | 209/121 |
| 3,407,932 | 10/1968 | Northoff | 209/121 |
| 3,426,894 | 2/1969 | Pace | 209/121 |
| 3,807,555 | 4/1974 | Niederer | 209/121 |

Primary Examiner—Joseph W. Hartary
Assistant Examiner—Vit N. Miska
Attorney, Agent, or Firm—R. S. Kelly; J. W. Edwards; C. E. Tripp

[57] ABSTRACT

A ramp, positioned adjacent the discharge end of a delivery conveyor, guides eggs rolling downwardly from the delivery conveyor to a weighing cradle that is supported by a scale. A track guides eggs rolling from the weighing cradle to an egg receiving pocket, and a rotary sweeper, positioned above the ramp, weighing cradle and track, controls the movement of eggs therealong. The ramp moves downward in timed relationship with the movement of the delivery conveyor and the sweeper so that when an egg is positioned on said weighing cradle, free from contact by the sweeper, any support of the egg by the ramp is removed before a scale reading is taken.

12 Claims, 7 Drawing Figures

FIG_2

FIG_3

FIG_7 ns to apparatus for
EGG WEIGHING APPARATUS

BACKGROUND OF THE INVENTION

1. Field of the Invention

The present invention pertains to egg weighing apparatus, and more particularly, it pertaiuse in conjunction with commercial egg grading machines for handling a series of continuously moving, uniformly spaced eggs and obtaining the weights thereof.

2. Description of the Prior Art

In commercial egg grading machines it is conventional to weigh each of the eggs handled by the machines in order to sort the eggs into the various weight grades by which they are conventionally sold in the marketplace. Since the egg grading machines must process a considerable number of eggs during short increments of time in order to be economical, the individual egg weighing operations must be achieved rapidly, and yet, their accuracy must be high since the separations between the various weight grades of eggs are small. Typically, prior art egg grading machines have provided mechanisms which conveyed each egg over a series of scales with the scales being linearly arranged in descending weight grade order, and additional means have been provided to divert an egg when, or just after, it actuates a particular scale in the series.

In an early egg weight grading machine, as shown in U.S. Pat. No. 2,020,511, the eggs were merely pushed over the series of grading scales as they were moved continuously by a conventional pocketed roller type of egg conveyor. Such machines obviously lacked the accuracy which is necessary for properly grading eggs since the pushing mechanisms could effect the weight of the egg as registered by the scales. In other commercial egg graders, as shown for example in U.S. Pat. Nos. 2,773,597 and 2,112,259, the eggs were arranged to be weighed as they were rolled across the scales. However, since egg shells are typically rough and may possess uneven surfaces and odd shapes, certain dynamic effects could be imparted to the scale mechanisms which could alter the recorded or indicated weights and cause an egg to be discharged at an improper weight grade station. In order to overcome these defects, most of the prior art commercial egg grading machines relied upon mechanisms which physically picked up each egg from one scale and deposited it upon another scale where it remained in a stable and stationary position for a short period of time during the weighing thereof with the process being repeated until the proper weight grade of the egg was determined. While such mechanisms eliminated many of the problems involved with the aforedescribed prior art devices, such scale means typically take up a large portion of the egg grading machine and limit the speed with which the eggs can be processed.

Other prior art egg grading machines and the egg weighing mechanisms therefor are shown in U.S. Pat. No. 3,135,386 to Reading and U.S. Pat. No. 3,407,932 to Northoff. In the Reading machine eggs are moved by a chain having uniformly spaced pusher bars arranged thereon. The pusher bars move the eggs in uniformly spaced positions up an inclined track section and then direct them onto a short, downwardly inclined track section where the eggs roll out of engagement with a trailing pusher bar and into engagement with the trailing edge of the adjacent forwardly located bar. At the bottom of the short track section the eggs are received upon a scale platform which has a slight upwardly projecting abutment at its forward edge so as to cause the eggs to remain thereon while the forwardly located pusher bar moves out of engagement therewith. The eggs remain on the scale platform while the weight reading is taken and until the trailing pushing bar again engages the egg to move it off the scale platform. As with other conventional egg grading devices, if an egg actuates a certain scale, means are provided to divert the egg into the correct packing station after it has been moved off of the scale platform.

The aforementioned United States patent to Northoff discloses a continuous egg grading system wherein eggs are moved in an undulatory guide path comprised of adjacent hills and valleys with scale platforms being received at the low points of the path, i.e., in the valleys. Rotary sweepers are centered over the scale platforms and they are comprised of a plurality of radially extending arms. One of these arms serves to lower an egg down into a valley and leave it on the scale platform until the adjacent trailing arm of the sweeper sweeps the egg therefrom and into the next scale grading area. Actuation of any one of the scale platforms causes that platform to transfer the egg thereon to a discharge location.

In recent years, with the advent of solid state circuitry and low cost memory devices, there has been a trend toward the use of a single scale for determining the weight of an egg as opposed to the more conventional aforementioned prior art systems wherein a series of scales weighed each egg until its weight grade was obtained. Obviously, with only one scale weighing each egg, the accuracy of the scale is essential, and all dynamic effects and the like which might effect the recorded weight of the egg must be eliminated. In one known device, each egg is rolled across an egg scale, and information with regard to its weight is recorded, placed in a memory, and used to discharge the egg at a downstream position. Such egg weighing device lacks the accuracy necessary for good quality weight grading since the rolling of the eggs across the scale could result in inaccurate weight indications. In another recently proposed device, eggs are moved onto a stationary scale platform and then swept therefrom by an intermittently driven sweeper arm after the weights are determined. This device presents transfer problems particularly if a high processing speed is desired.

SUMMARY OF THE INVENTION

The apparatus of the present invention includes a scale mechanism which is arranged to weigh each egg of a continuous series of eggs in order to determine its weight. The scale mechanism includes means for providing positive control over the eggs as they are transferred onto and off of an egg weighing scale platform and for maintaining each egg in a stable and stationary position on the scale platform during the weighing operation without such means influencing the scale reading of the actual egg weight. Advantages of the present invention include the ability to gently handle a large number of eggs in a short period of time and the ability to obtain an accurate scale reading for the weight of each egg.

One of the features of the apparatus of the present invention is the ramp for guiding the eggs onto the weighing cradle which ramp is arranged to be automatically lowered from its egg conveying position when an egg is received in position on the weighing cradle so as to remove any extraneous support from the egg when the scale reading is taken.

At the conclusion of the taking of the scale reading, means are provided to remove the weighed egg from the weighing cradle and to permit the next egg to be received on the cradle. In the preferred form of the invention, this means comprises a sweeper having spaced pusher arms which push one egg off of the weighing cradle while guiding the following egg onto the cradle. The ramp movement is timed in relationship to the movement of an egg delivery conveyor in order to assure that the ramp will be in the proper position for both egg handling and egg weighing. The scale reading is also taken in timed relationship with the movement of the delivery conveyor and with the movement of the pusher arms of the sweeper so that when a scale reading is taken, the egg being weighed will be free from contact with the sweeper.

At all times during transfer and weighing, the egg is supported at three or more spaced contact points in order to maintain its stability and to prevent, or at least minimize, the introduction of dynamic effects which could result in false scale readings.

DESCRIPTION OF THE PREFERRED EMBODIMENT

Figure 1:
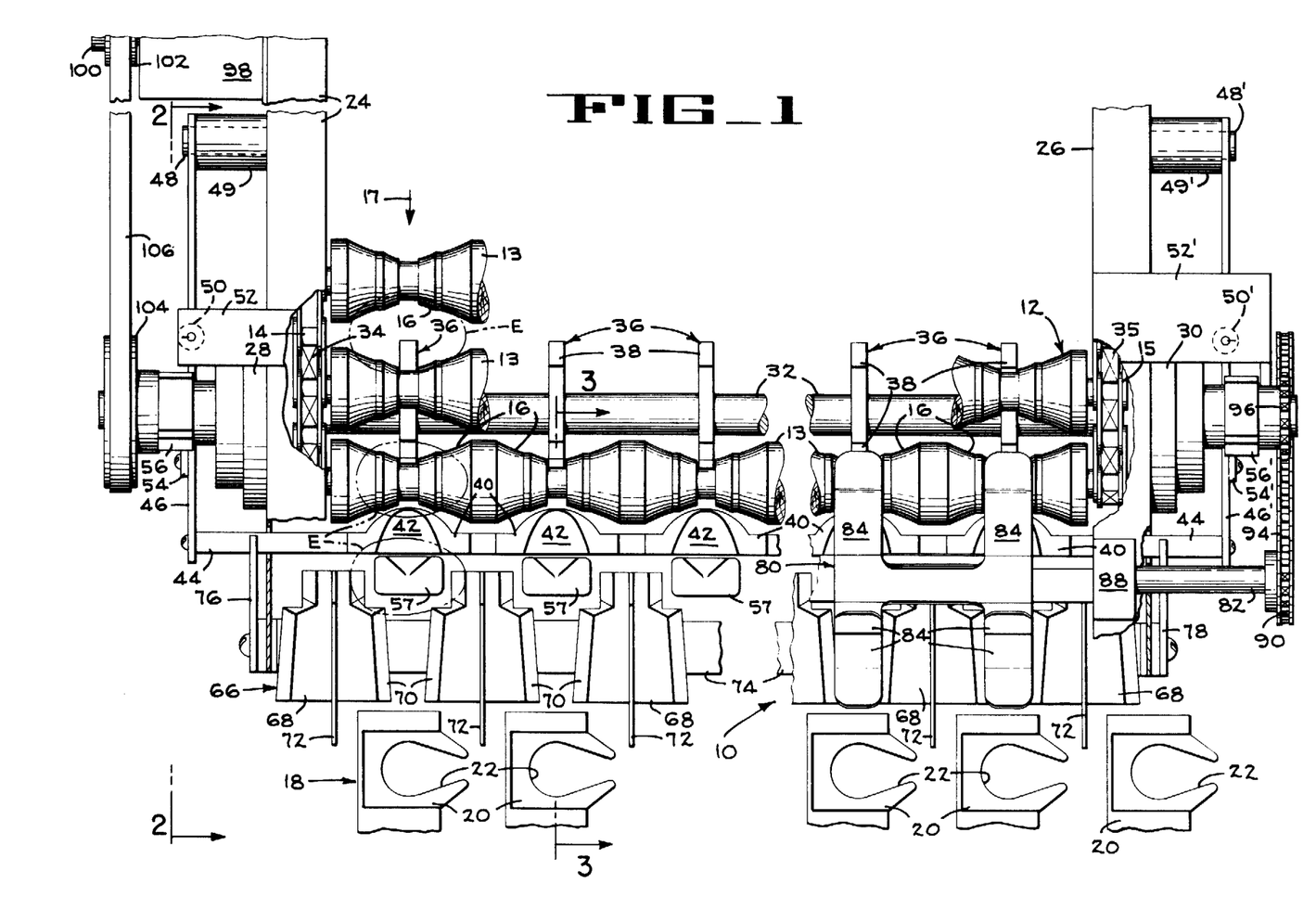
FIG. 1 is a broken diagrammatic plan view of an egg weighing apparatus embodying the present invention.

With reference to FIG. 1, an egg weighing apparatus 10 which embodies the present invention is shown positioned adjacent the discharge end of a delivery conveyor 12. The delivery conveyor which is shown is of the conventional grooved roller type and includes a plurality of parallel grooved or grommeted rollers 13 mounted between a pair of endless conveyor chains 14 and 15 with pockets 16 formed at the grooved portions between adjacent rollers to receive eggs. Such a conveyor is shown and described, for example, in U.S. Pat. No. 3,252,607 issued May 24, 1966 to Boyd W. Rose et al. The delivery conveyor 12 is used for feeding eggs E in a multiple number of lanes (as determined by the number of pockets 16 between each adjacent pair of rollers) with the eggs being oriented on the delivery conveyor so that their major axes extend horizontally and transversely of the direction of movement of the delivery conveyor. Such orientation is maintained as the eggs are fed in the direction of an arrow 17 to the egg weighing apparatus 10.

Upon reception of a row of eggs by the egg weighing apparatus 10, the eggs are simultaneously weighed and then conveyed to an egg transfer mechanism 18 which may be of the type disclosed in a copending U.S. Pat. application, Ser. No. 428,168 of Boyd W. Rose and George W. Thornton, which application is assigned to the same assignee as is the present application. The egg transfer mechanism includes a transfer cup 20 for each egg feeding lane of the delivery conveyor 12, and each transfer cup has an egg receiving pocket 22 therein. The delivery conveyor is continuously driven at a uniform speed during operation of an egg handling system, and the egg weighing apparatus of the present invention can be positioned adjacent the discharge end of the delivery conveyor and driven therefrom so as to maintain the uniform processing speed of the system.

Delivery conveyor 12 is supported by frame members 24 and 26 which support the endless conveyor chains 14 and 15 on each side of the grommeted rollers 13. A bearing 28 is mounted to the forward end of frame member 24, and a similar bearing 30 is mounted to the forward end of frame member 26. A shaft 32 is journalled within each of the bearings 28 and 30 and extends therebetween with suitable sprocket wheels 34 and 35 being mounted thereon for supporting the downstream, or discharge, end of the endless conveyor chains 14 and 15. A plurality of spiders 36 are mounted at spaced intervals along shaft 32, as shown in FIG. 1, for supporting the rollers 13 as they move about the axis of shaft 32 at the discharge end of the delivery conveyor 12. Spiders 36 are each comprised of four equiangularly spaced feet 38 (FIG. 2) which project upwardly into the pockets between the rollers to eject the eggs from the discharge end of the delivery conveyor.

Figure 3:
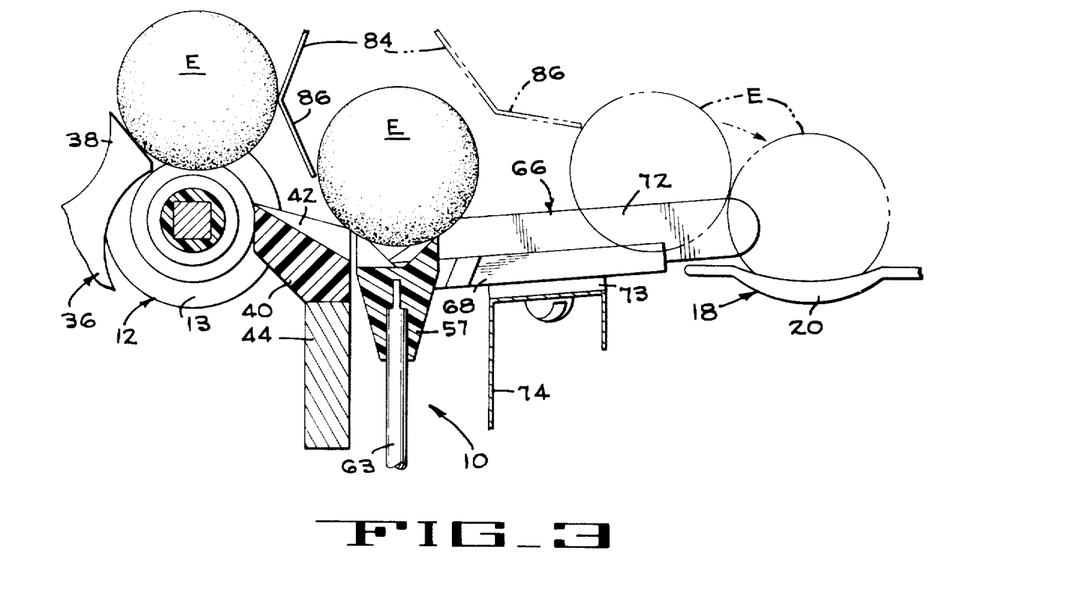
FIG. 3 is an enlarged sectional view of one of the ramps and weighing cradles taken on the line 3—3 of FIG. 1.

A series of ramps 40 are positioned adjacent the discharge end of the delivery conveyor 12 with each ramp being aligned to receive eggs from one of the egg lanes of the delivery conveyor. The upper surfaces of the ramps are downwardly inclined from the delivery conveyor (FIG. 3), and each ramp surface has a spoon-shaped groove 42 therein extending longitudinally in the direction of egg travel to receive the enlarged central circumferential portion of an egg. While an egg is on the ramp it is supported at the edges of the groove 42 on opposite sides of the enlarged central circumferential portion of the egg. Thus, it will be seen that eggs discharged from the delivery conveyor 12 will roll about their longitudinal axes down the ramps.

Ramps 40 are mounted upon a transverse beam 44 that extends between and is rigidly connected to the free ends of a pair of pivotable support arms 46 and 46'. Support arm 46 is rotatably mounted by means of a pin 48 (FIG. 2) which is journalled within a hub 49 that extends outwardly from the frame member 24. A tension spring 50 is coupled between the support arm and a plate 52 projecting outwardly from the top of the frame member 24 and serves to resiliently urge the support arm upwardly. A finger 54 is rigidly mounted to the free end of the support arm and projects upwardly therefrom to contact a four-lobed cam 56 that is mounted upon the laterally projecting end of shaft 32. Upon rotation of shaft 32, the cam lobes successively bear upon the finger 54 forcing the support arm 46 downwardly with the arm being urged upwardly by the tension spring 50 as the cam lobes pass the finger 54.

In a manner similar to support arm 46 the opposite support arm 46' is pivotally connected to frame member 26 by means of a pin 48' and hub 49' and is resiliently urged upwardly by a tension spring 50' that is connected between the support arm 46' and a plate 52' secured to the top of the frame member 26. A finger 54' mounted on the projecting end of support arm 46' is arranged to be engaged by a four-lobed cam 56' which is similar to cam 56 and which is also attached to a projecting end of shaft 32 for moving the support arm 46' downwardly upon rotation of the shaft. Thus, it will be seen that ramps 40 are cyclically lowered and elevated in timed relationship with the rotation of shaft 32 of the delivery conveyor 12.

Figure 5:
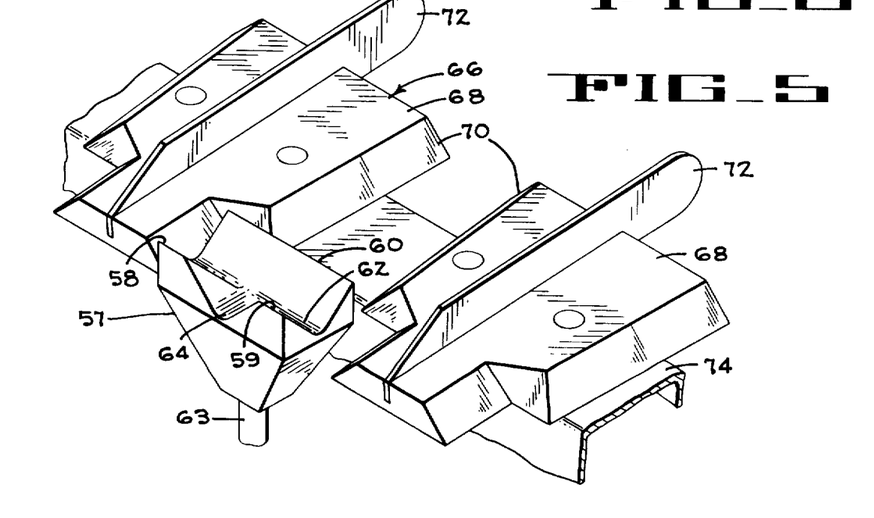
FIG. 5 is an enlarged perspective view of one of the egg weighing cradles and the track that guides the eggs therefrom.

A series of weighing cradles 57 (FIG. 3) are positioned directly adjacent to the lowermost ends of ramps 40 so that each weighing cradle will receive eggs from one of the ramps. As shown in FIG. 5, the upper surface of each weighing cradle is formed by a pair of laterally spaced ridges 58 and 59 extending along the egg receiving side of the cradle and another ridge 60 extending clear across the egg discharge side of the cradle. These ridges jointly define a groove 62 extending transversely of the direction of egg travel. A short groove 64 is provided between ridges 58 and 59 which groove extends in the direction of egg travel to receive the enlarged central circumferential portion of an egg as it rolls onto the weighing cradle and comes into abutment with the transverse ridge 60 which stops the forward progress of the egg. Each egg will thus be supported in a stationary position upon the weighing cradle by ridges 58 and 59 and by ridge 60 with the ridges forming a tripod for supporting the egg in a stable manner during the time that it is being weighed.

The weighing cradles 57 are mounted at the top of support rods 63 which project upwardly from scales 65 of the load cell type (FIG. 2) that serve to weigh the eggs. Such load cell type scales are conventional and may include, for example, a plurality of strain guages connected in a bridge circuit for sensing the strain imposed thereon by the loading of the associated support rod 63. The resistance of the guage elements are changed under the change in the loading imposed by the support rod so that the weight of an egg can be determined by measuring the change in the voltage across the bridge circuit. Since eggs are relatively light in weight and since classification into one of several different egg grades are to be determined by the weighing of the eggs, the load cells must have a high sensitivity suitable for such purpose. Load cells suitable for weighing eggs can be purchased from ORMAND INCORPORATED, Santa Fe Springs, Calif. It should further be noted that the scales 65 are supported independently of the delivery conveyor frame members 24 and 26 by a separate frame structure, not shown, in order to eliminate the influence of vibrations from the delivery conveyor.

Between each weighing cradle 57 and associated egg receiving pocket 22 is a track 66 for guiding the eggs from the cradle to the pocket. Each track 66 (FIG. 5) causes the eggs to roll up an incline and is formed by a pair of spaced guide blocks 68 that have beveled side surfaces 70 converging in the direction of movement of an egg toward the egg receiving pocket. Each guide block 68 is provided with a longitudinally extending groove having a thin finger 72 fitted therein to project upwardly and outwardly therefrom, as shown in FIG. 5.

These fingers 72 serve to maintain the eggs in a centered position with respect to the track 66. All of the guide blocks 68 are mounted upon spacer blocks 73 which are secured to the top surface of a transverse beam 74 that extends between and is connected to the forward ends of frame members 24 and 26 (FIG. 1). The transverse beam 74 also serves to mount a pair of stop plates 76 and 78 (FIG. 1) at the sides of the egg weighing apparatus which stop plates extend over the projecting ends of transverse beam 44 to limit the upward movement of the ramps 40.

Movement of the eggs down ramps 40, across the weighing cradles 57, and up the tracks 66 to the egg receiving pockets 22 is controlled by a series of spaced rotary sweepers 80 which are positioned directly above each of the weighing cradles. These sweepers are each mounted upon a transversely extending shaft 82. Each sweeper (FIGS. 2 and 4) is comprised of four, equiangularly spaced arms 84 which are mounted in spider-like fashion on the shaft with each arm being oriented perpendicularly with respect to the adjacent arms. Each sweeper arm 84 has an angled portion 86 adjacent its outermost end to provide a spacing in the direction of rotation between its leading edge and trailing edge sufficient for maintaining a proper spacing between eggs on the weighing cradle 57 and the ramp 40. It should be noted, from FIG. 3, that the trailing edge of a sweeper arm governs the position of the egg rolling down the ramp 40 while the leading edge of the sweeper arm pushes the immediately preceeding egg from the weighing cradle 57 and up the track 66.

Figure 2:
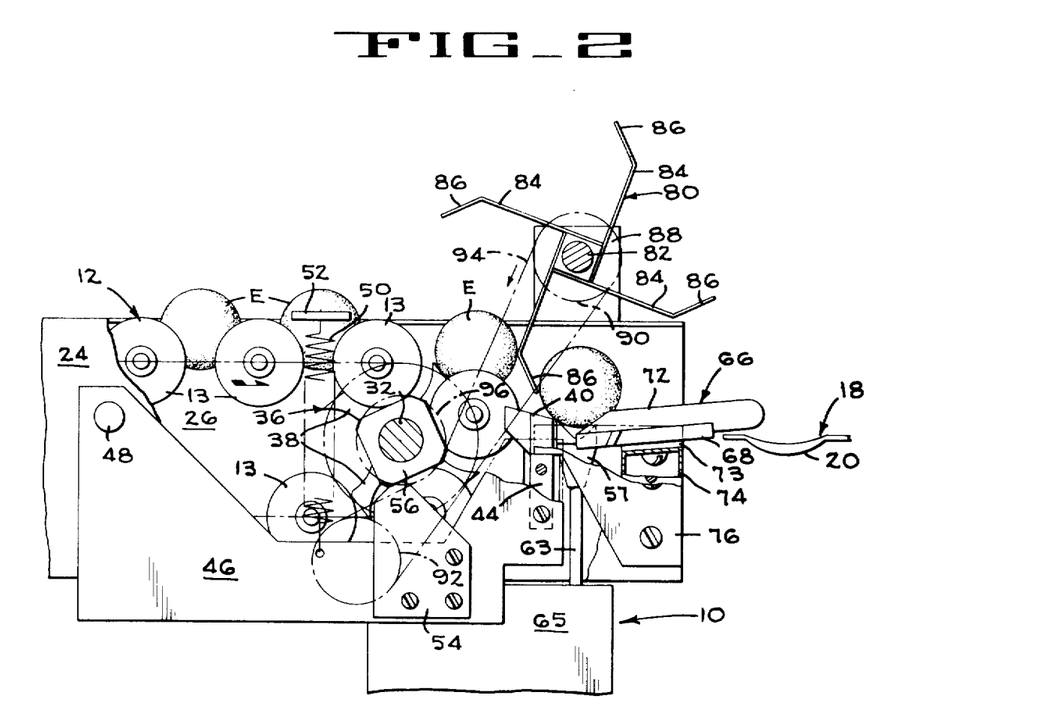
FIG. 2 is a sectional view taken on the line 2—2 of FIG. 1.
Figure 4:
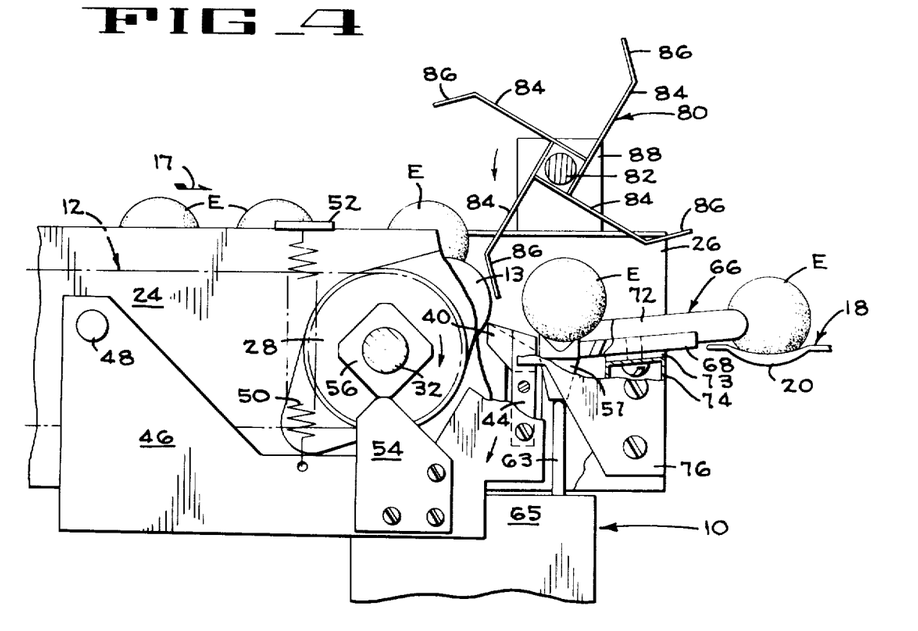
FIG. 4 is a sectional view similar to FIG. 2, but showing the ramp in a lowered position permitting an egg to be weighed on the egg weighing cradle.

Shaft 82, which carries the rotary sweepers 80, is journalled in bearing blocks 88 mounted on the forward end of frame members 24 and 26 (only one of such blocks being shown in FIGS. 1, 2 and 4). A sprocket 90 is mounted on one of the outwardly projecting ends of shaft 82, and an idler sprocket 92 (FIG. 2) is mounted on a stub projecting from frame member 26. A drive chain 94 is trained about sprockets 90 and 92, and the drive chain is drivingly engaged by a drive sprocket 96 (FIG. 1) mounted on shaft 32 of the delivery conveyor 12 in order to drive the rotary sweepers 80 in synchronism with the movement of the delivery conveyor.

Figure 6:
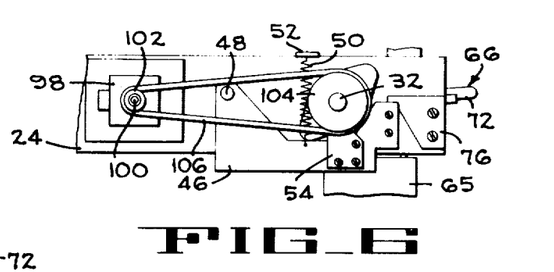
FIG. 6 is a reduced left side elevational view of the egg weighing apparatus of FIG. 1 illustrating the mechanical timing switch drive.

A mechanical timing switch 98, shown in FIGS. 1 and 6, is mounted on frame member 24 and includes a timing shaft 100 with a toothed timing pulley 102 mounted thereon. The timing switch is adapted to provide a short duration output pulse during each revolution of the timing shaft 100. A toothed timing pulley 104 is mounted upon the projecting end of shaft 32 of the delivery conveyor and has four times as many teeth as timing pulley 102. Thus, a timing belt 106, trained about the timing pulleys, drives the timing shaft 100 of timing switch 98 and causes the shaft to make four revolutions for each revolution of conveyor shaft 32. The mechanical timing switch 98 thereby provides four pulses for each revolution of the drive shaft 32 or one pulse for each row of eggs delivered therefrom. These pulses are provided to the scales 65, in a manner to be pointed out in greater detail hereinafter, in order to provide an output signal for certain weight grading circuitry as shown in FIG. 7.

Figure 7:
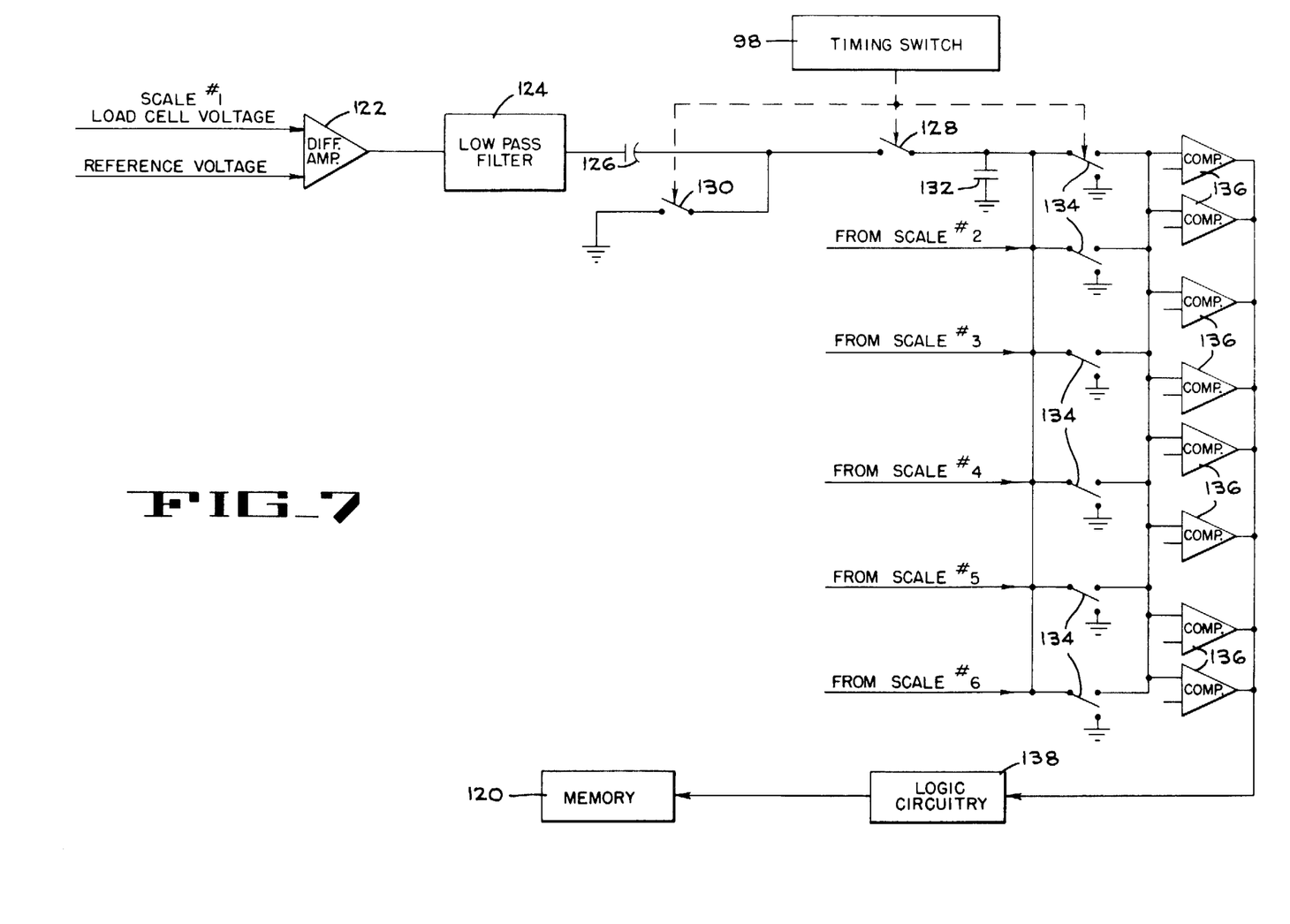
FIG. 7 is an electrical schematic diagram of the weight sensing and signaling circuitry associated with each of the scale mechanisms.

FIG. 7 shows the electrical circuitry connecting each of the scales 65 (denoted in FIG. 7 as Scale No. 1 through Scale No. 6) with a memory unit 120 which records the weight grades of all of the eggs processed in the egg handling system of the present invention so as to permit the eggs to be discharged (in a downstream portion of the system—not shown) at the proper positions for packing. The load cell voltage from Scale No. 1 is continuously delivered to one of the inputs of a differential amplifier 122 with the other input thereof being provided by a reference voltage which is set at a predetermined value. The load cell voltage and reference voltages are selected so that the output of the differential amplifier will be "zero" when there is no egg received upon the associated weighing cradle 57.

The pulse from timing switch 98 (by means of conventional electronic circuitry components—not shown) is utilized to control the closing of a gate 130 so that this gate will be closed at a time when no egg is received upon the egg weighing cradle 57 for Scale No. 1. This will occur during a time when one of the sweeper arms 84 has swept an egg off of the cradle and before the trailing edge of the arm has permitted the following egg to be received upon the cradle. During this time interval the output of the differential amplifier 122 should be approximately zero. However, since egg refuse, dirt or other extraneous foreign material can accumulate on the weighing cradle to affect the weight reading, the circuitry is designed to operate so that any additional weight which is on the cradle will cause a signal to be passed through a low pass filter circuit 124 and to be recorded by charging a capacitor 126 to a particular value. At a subsequent time when the ramp 40 associated with Scale No. 1 is in the lowermost position, as shown in FIG. 4, the weight reading of the egg on the weighing cradle is taken. At this time a pulse from the timing switch 98 functions to close a second gate 128 for a short period of time. This is accomplished by conventional one-shot circuitry (not shown) which derives a delayed pulse from the timing pulse produced by the timing switch 98. Any weight signal which is already recorded on the capacitor 126 will be subtracted from the egg weight signal delivered from the differential amplifier 122 in order to give an accurate weight signal which will correspond to the weight of the egg only. Thus, the scale is effectively "zeroed" between each weighing to insure that its accuracy is preserved. The corrected egg weight signal is passed through the closed gate 128 to a conventional sample and hold capacitor 132. When the gate 128 opens, a gate 134 is closed (by conventional logic circuit means—not shown) to simultaneously provide the weight grade signal at the inputs of a series of comparators 136 where such weight grade signal is compared with a series of selected and preset signals. Logic circuitry 138 is connected to the output of each of the comparators 136 in order to determine the correct weight grade for the egg being weighed depending upon the number of comparators which are actuated. The weight grade information from the logic circuitry 138 is recorded in the memory device 120 for subsequent processing and control of the egg which has just been weighed. The timing switch 98 also provides a delayed pulse (by conventional means—not shown) which serves to ground the switch 134 immediately after the weight signal is processed through the comparators in order to discharge the charge on the sample and hold capacitor 132.

While FIG. 7 shows the complete circuitry only for Scale No. 1, it will be understood that similar circuitry is provided for each of Scale No. 2 through Scale No. 6. The timing switch 98 functions to sequentially activate each of the switches 134 during the weighing operation and while the ramps 40 are in their lowered positions and the eggs are received upon the weighing cradles 57. In this manner each of the weight grades for the six eggs in a row on the delivery conveyor 12 can be individually recorded in the memory unit 120 during that brief time interval after the eggs have achieved stable positions and before the trailing sweeper arms engage the eggs to move them off of the weighing cradles. This is the time when the eggs will be in their most stable conditions after all dynamic effects have been given a maximum amount of time to settle out.

In the operation of the apparatus 10 of the present invention eggs are arranged to be continuously delivered to the apparatus by the delivery conveyor 12. The eggs are ejected from pockets 16 on the delivery conveyor by fingers 38 and caused to roll down ramps 40 to the weighing cradles 57. The eggs are supported in a stable manner on the weighing cradles by spaced ridges 58, 59 and 60 that form a tripod, and sweeper arms 84, which guided and limited the movement of the eggs down the ramps, are rotated out of engagement with the eggs. The ramps are then lowered by the action of cams 56 and 56', as shown in FIG. 4, and scale readings are taken by the operation of mechanical timing switch 98 and the circuitry of FIG. 7 previously discussed. As the lobes on the cams 56 and 56' move past the fingers 54 and 54', tension springs 50 elevate the support arms 46 and 46' to return the ramps 40 to their normal elevated positions for feeding eggs to the weighing cradles. Continued rotation of the sweeper arms brings the trailing sweeper arms into engagement with the eggs to push the eggs from the weighing cradles and up tracks 66 to the egg receiving pockets 22 of the egg transfer mechanism 18.

Eggs conveyed down the ramps, across the weighing cradles, and up the tracks are maintained in a stable supported condition at all times by at least three spaced points of support. On the ramp and track, each egg is supported at two laterally spaced points on opposite sides of its enlarged central circumferential portion so that the egg can roll transversely about its major longitudinal axis, and the sweeper arm provides the third point of contact to control the rolling of the egg. On the weighing cradle, where a sweeper arm is not always in contact with the egg, support is provided by ridges 58 and 59 spaced on opposite sides of the enlarged central circumferential portion of the egg and ridge 60 which contacts the egg along its enlarged central circumferential portion at a location spaced laterally from ridges 58 and 59.

Although the best mode contemplated for carrying out the present invention has been herein shown and described, it will be apparent that modification and variation may be made without departing from what is regarded to be the subject matter of the invention.

What is claimed is:

1. An apparatus for weighing eggs as they are transferred from the discharge end of a delivery conveyor to an egg receiving pocket, said apparatus comprising a ramp positioned adjacent the discharge end of the delivery conveyor and having an inclined egg supporting surface for receiving eggs from said delivery conveyor and guiding them in a downward direction, a weighing cradle positioned adjacent the lowermost end of the ramp for receiving eggs from the ramp; scale means supporting said weighing cradle;

a track positioned between the weighing cradle and the egg receiving pocket for receiving eggs from said cradle and guiding them to said pocket;

a rotary sweeper positioned above said ramp, weighing cradle and track, said sweeper being comprised of a plurality of spaced pusher arms with each arm being arranged to engage the leading face of an egg to limit the rate of roll of the egg down the ramp and to simultaneously engage the trailing face of an egg to push the egg from the weighing cradle along the track towards the egg receiving pocket; and means for moving said ramp downwardly in timed relationship with the movement of the delivery conveyor and the sweeper so that each egg passing over said ramp will be positioned on said weighing cradle for a period of time free from contact by the pusher arms of the sweeper and the ramp.

2. An apparatus as described in claim 1 including a pivot arm for mounting said ramp and means for resiliently urging said pivot arm upwardly and wherein said means for moving said ramp downwardly in timed relationship with the movement of the delivery conveyor and the sweeper includes a cam mounted for rotation with the movement of the delivery conveyor and positioned so as to force the pivot arm downwardly when the sweeper arms are out of contact with an egg on the weighing cradle.

3. An apparatus as described in claim 1 wherein said ramp is grooved in the direction of egg travel to receive the enlarged central circumferential portion of the egg.

4. An apparatus as described in claim 1 wherein said weighing cradle has a first ridge along its upper surface on the egg receiving side and a second ridge along its upper surface on the egg discharge side, said ridges defining a groove therebetween that extends transversely of the direction of egg travel, said first ridge having a groove extending in the direction of egg travel to receive the enlarged central circumferential portion of the egg.

5. An apparatus as described in claim 1 wherein said track includes two spaced apart support members that converge in a direction extending away from the weighing cradle so as to elevate an egg as it is swept along the track by the sweeper.

6. An apparatus as described in claim 1 wherein said pusher arms of said sweeper are mounted upon a rotary member so as to extend radially therefrom at equiangularly spaced positions.

7. An apparatus as described in claim 1 wherein said scale means are supported independently of the support of the delivery conveyor, ramp and track.

8. An apparatus as described in claim 2 wherein said scale means includes a weight-sensitive electric transducer, and electrical means operatively connected with said transducer for sensing the weight of the weighing cradle when no egg is positioned thereon and for sensing the weight of the weighing cradle when an egg is subsequently positioned thereon and for electrically subtracting the first sensed weight from the second in order to determine the weight of said egg.

9. An apparatus as described in claim 6 wherein each of said sweeper pusher arms is contoured adjacent its outermost end so as to provide a spacing between the leading edge of the arm and trailing edge of the arm sufficient for maintaining a spaced relationship between the egg being guided on the weighing cradle and the egg being pushed off the weighing cradle.

10. An apparatus as described in claim 8 including electrical means operatively associated with said scale means for sensing the weight of the weighing cradle when no egg is positioned thereon and for sensing the weight of the weighing cradle when an egg is subsequently positioned thereon and for electrically subtracting the first sensed weight from the second in order to determine the weight of said egg.

11. In an apparatus for weighing eggs as they are transferred from the discharge end of a delivery conveyor to an egg receiving pocket; said apparatus having a ramp positioned adjacent the discharge end of the delivery conveyor for guiding eggs rolling downwardly thereon; a weighing cradle positioned adjacent the lowermost end of the ramp for receiving eggs from the ramp; scale means supporting said weighing cradle; and wherein the improvement comprises means for moving said ramp downwardly in timed relationship with the movement of the delivery conveyor so that when an egg is positioned on said weighing cradle, any support of the egg by the ramp is removed before a scale reading is taken.

12. In an apparatus for weighing eggs as they are transferred from the discharge end of a delivery conveyor to an egg receiving pocket; said apparatus having a ramp positioned adjacent the discharge end of the delivery conveyor for guiding eggs rolling downwardly thereon; a weighing cradle positioned adjacent the lowermost end of the ramp for receiving eggs from the ramp; scale means supporting said weighing cradle; and a rotary sweeper positioned above said ramp and weighing cradle for limiting the rate of roll of eggs down the ramp and for pushing eggs from the weighing cradle into said egg receiving pocket, said sweeper being movable in timed relationship with the movement of said delivery conveyor; wherein said improvement comprises said ramp having a surface configuration for supporting each egg on opposite sides of an enlarged central circumferential portion of the egg so that the egg can roll transversely about its major longitudinal axis, said sweeper contacting the egg along its enlarged central circumferential portion at a location spaced transversely from the first two contact points to control the rolling of the egg, and said weighing cradle having a pair of laterally spaced and aligned ridges arranged to support opposite sides of the enlarged central circumferential portion of the egg and having a third laterally extending ridge which contacts the egg along its enlarged central circumferential portion of the egg at a location spaced circumferentially on the egg from the pair of ridges so as to provide a three point support for the egg while it is being weighed.

* * * * *

UNITED STATES PATENT OFFICE
CERTIFICATE OF CORRECTION

PATENT NO. : 3,901,334
DATED : August 26, 1975
INVENTOR(S) : BOYD W. ROSE

It is certified that error appears in the above-identified patent and that said Letters Patent are hereby corrected as shown below:

Column 6, line 38, after "stub" insert --shaft--.

Signed and Sealed this twenty-fourth Day of February 1976

[SEAL]

Attest:

RUTH C. MASON
Attesting Officer

C. MARSHALL DANN
Commissioner of Patents and Trademarks